United States Patent [19] [11] 3,873,479
Zotov et al. [45] Mar. 25, 1975

[54] THERMOSETTING PLASTICS FOR LOOM SHUTTLES AND OTHER DYNAMICALLY HEAVILY LOADED SHOCK ABSORBER AND ANTIFRICTION ARTICLES AND A METHOD FOR PRODUCING SAID PLASTICS

[76] Inventors: Mikhail Nikolaevich Zotov, Prospect Mira, 46, kv. 12; Vulf Kopelevich Peisakhov, 8 ulitsa Sokolinoi Gory, 7, kv. 48; Iosif Naumovich Partsy, Sevanskaya ulitsa, 13, korpus 1, kv. 33, all of Moscow, U.S.S.R.

[22] Filed: Nov. 16, 1972

[21] Appl. No.: 307,225

Related U.S. Application Data

[63] Continuation-in-part of Ser. No. 2,354, Jan. 12, 1970, abandoned.

[52] U.S. Cl......... 260/17.2, 139/196 R, 139/196 A, 260/841
[51] Int. Cl.............................................. C08g 51/18
[58] Field of Search........ 260/841, 17.2; 139/196 R, 139/196 A

[56] References Cited
UNITED STATES PATENTS
3,378,043   4/1968   Naul et al............................ 139/196

FOREIGN PATENTS OR APPLICATIONS
744,182    8/1970   Belgium............................. 260/17.2
1,964,500  7/1971   Germany........................... 260/17.2
1,304,000  1/1973   United Kingdom................ 260/17.2
594,579   11/1947   United Kingdom................. 260/841
617,605    2/1949   United Kingdom................. 260/841
582,807   11/1946   United Kingdom................. 260/841
307,032    9/1929   United Kingdom............. 139/196 R
131,302    2/1949   Australia............................ 260/841

*Primary Examiner*—Morris Liebman
*Assistant Examiner*—Edward Woodberry

[57] ABSTRACT

Thermosets for loom shuttles and other dynamically heavily loaded shock absorber and antifriction parts, comprising the homogeneous combination products of a dry refined phenolic novolac resin having an Ubbelodhe melting point of between 105 and 120°C and containing not over 4 wt. per cent of free phenol, with a polyamide of barecelled structure.

12 Claims, No Drawings

THERMOSETTING PLASTICS FOR LOOM SHUTTLES AND OTHER DYNAMICALLY HEAVILY LOADED SHOCK ABSORBER AND ANTIFRICTION ARTICLES AND A METHOD FOR PRODUCING SAID PLASTICS

CROSS-REFERENCE TO RELATED APPLICATION

This application is a continuation-in-part of our co-pending application Ser. No. 2,354, filed Jan. 12, 1970, now abandoned.

This invention refers to thermosetting plastics for fabricating loom shuttles and other heavily loaded shock absorber and antifriction parts and articles. Said plastics possess high strength, shock absorbing and antifriction properties and are new.

The principal object of the invention is to provide a material closely reproducing the properties of shuttle wood and suitable for fabricating loom shuttles.

Said object has been accomplished by producing thermosetting plastics which, according to the invention, are the homogeneous combination product of a dry refined phenolic novolac resin with a polyamide of bare-celled structure, having the following main physical and mechanical properties:

| | |
|---|---|
| specific gravity | 1.2 - 1.27 |
| specific impact strength | 10–120 kg.cm.cm$^2$ |
| Raschig flowability | 40–120 mm |
| setting rate at 140-150°C | 0.5–1.5 min/mm |
| Martens temperature | 120–130°C |

Said thermosets are made by a method which, comprises combining a dry refined phenolic novolac resin having an Ubbelodhe melting point between 105° and 120°C and a free phenol content not over 4 per cent by weight, taken as a solution in an organic solvent or as a melt with a polyamide of bare-celled structure, with the addition of hardening and plasticizing agents, cellulose and at least one of the group consisting of graphite, ferric oxide and talcum.

Said polyamide is used in the form of netted cord with cell sizes up to 8 × 8 – 120 × 120 mm and cord diameter of 0.5–5.0mm. It is advisable to employ depreciated polyamide fishnets, i.e. used nets.

The cellulose is used in the form of unspun cotton, impregnated with a phenolic resole resin preliminarily or in the form of wood meal.

The organic solvent for the phenolic resin may be a solvent such as ethyl alcohol or acetone, which actively dissolves not only the resin, but also the hardening agent, which is hexamethylene tetramine and the plasticizer, which may be oleic acid or stearic acid.

Depending on the intended use of the thermosetting plastics to be used its ingredients are present in weight parts:

| | |
|---|---|
| polyamide in the form of fishnets | 60–70 |
| dry phenolic novolac resin | 35–50 |
| cellulose in the form of unspun cotton preliminarily impregnated with phenolic resole resin or wood meal | 0–20 |
| hexamethylene tetramine | 4.2–6.0 |
| plasticizing agent (oleic or stearic acid) | 1.2–1.8 |
| graphite, ferric oxide, talcum | 2.0–6.5 |

Combining the polyamide with the phenolic resin may be accomplished, as was indicated above, either in the resin melt or in solution in an organic solvent.

Depending on the weight proportion of the ingredients each of said ways results in a themosetting plastic of definite predetermined properties according to the intended use of the thermosetting plastic.

For example, the following technology is recommended for the production of a thermosetting plastic with high strength characteristics. The phenolic novolac resin and the polyamide, taken in net form, are blended by milling, the temperature of the front roll being 90°–110°C and of the rear one - 50°–70°C. The phenolic resin is taken as an acetone solution. Said solution should contain hexamethylene tetramine as the hardening agent, oleic acid as the plasticizer, a mixture consisting of graphite, ferric oxide, talcum, and cellulose, e.g. unspun cotton. Milling is conducted for a sufficient time to produce a compact sheet, which is further rolled to effect complete removal of the solvent and transition of the resin to a melt in the rubberlike state.

The resulting thermoset possesses the following main physical and mechanical characteristics:

| | |
|---|---|
| specific gravity | 1.22–1.23 |
| specific impact strength | 60–80 kg.cm.cm$^2$ |
| Raschig flowability | 40–60 mm |
| setting rate at 140–150°C | 1.0–1.5 min/mm |
| Martens temperature | 120–130°C |

This thermoset was used to fabricate loom shuttles and its performance in long-term service (5 years) was as follows: Shuttles made of said thermoset, working uninterruptedly in automatic looms for 5–6 months at a speed of 230–240 strokes per min., decreased labor required for their operation by 20–25 per cent, eliminated thread breakages and lowered overall weaving operation costs by 25 to 30 per cent.

Said performance of shuttles made of the thermoset produced are given as compared with wood shuttles.

Data characterizing the performance of said shuttles as compared with textolite shuttles are not given here because textolite shuttles are unsuitable for use in looms at 230–240 strokes per min. It is known to those skilled in the art that textolite shuttles, which are 30 per cent heavier than wood ones (in absolute weight) can be used on slow-running worsted looms operating at 160–170 strokes per minute.

To obtain thermosets with predominantly antifriction properties and heat resistance, suitable for fabricating friction parts and assemblies, the phenolic resin is combined with the polyamide according to the following technology.

The dry phenolic resin and the polyamide combined by milling at a temperature of 100°–110°C on the front roll and 20°–30°C on the rear one. The polyamide in the form of degraded (weakened) nets is wound on to the front roll of a frictionless mill.

The pulverized phenolic resin is fed to the polyamide in a mixture of hexamethylene tetramine, as the hardening agent, oleic acid as the plasticizer and of graphite. Milling in the resin melt is conducted to a sufficient time for ensure even distribution of the mixture components, determined by uniformity of the color and transition of the resin to the rubberlike state. This usually takes 3 to 4 min.

As is evident from the description, the use of thermosets offers a radical solution of the problem of replacing shuttle wood which is difficult to work, increases weaving costs due to high direct expenditures and to frequent replacements of shuttles and pickers resulting in chronic disorders in loom operation.

The use of the thermosets also solves the problem of fabricating heavily loaded and shock absorber parts used in railway transport in connection with the switch-over to concrete sleepers. Long-term tests of shock absorber and antifriction parts under various climatic conditions showed highly positive results.

This invention makes it possible to utilize fishing industry wastes which accumulate in the form of fishing nets in large quantities, and so far have found no rational application. The following examples of embodiment of the method of producing the thermosets are given by way of illustration.

EXAMPLE 1

The phenolic resin used is a dry refined phenolic novolac resin with an Ubbelodhe melting point of 115°C, containing not more than 4 per cent by weight of free phenol. The polyamide was in the form of webs- depreciated (used) fishing nets with cell size 20×20 – 80×80 mm and cord diameter of 1-3 mm, preliminarily washed and dried to 2-3 wt. per cent moisture. This polyamide contains only very small amounts of low-molecular-weight compounds as impurities, since these impurities are washed out by the water during the use of the nets.

Said phenolic resin is combined with the polyamide in a frictionless mill by soaking the polyamide with a solution of the resin in acetone. The components of the mixture are taken in the following amounts (kilograms):

| | |
|---|---|
| polyamide | 6.0 |
| phenolic resin | 4.0 |
| hexamethylene tetramine | 0.48 |
| oleic acid | 0.120 |
| ferric oxide | 0.10 |
| graphite | 0.10 |
| cellulose in the form of unspun cotton preliminarily impregnated with a phenolic resole resin | 2.0 |
| acetone | 2.4 |

The weight of polyamide indicated in the formulation is wound in an even layer on to the front roll of a hot mill and is soaked in an acetone solution of the phenolic resin, containing the hexamethylene tetramine and oleic acid in dissolved form. Milling is done in a frictionless mill with a constant clearance of 8 mm between rolls operating at 20-24 r.p.m. The additives indicated, namely, graphite, ferric oxide and cellulose in the form of unspun cotton preliminarily impregnated with a phenolic resole resin, are added during milling. Milling time is controlled to form a compact sheet with a surface temperature of 80°C. The resulting sheet is fed to a rolling mill with a front-roll temperature of 70°–80°C and a rear-roll temperature of 50°–60°C. To avoid overheating of the material due to the heat of the reaction and of friction, the sheet is cut transversely into 2 or 3 pieces. Rolling completely removes the solvent and transfers the resin from solution into melt form, thus ensuring efficient interaction of the resin with the hexamethylene tetramine.

Rolling is continued until a sheet 1.5-2 mm thick results. This is necessary for complete removal of the solvent, acetone.

The material obtained is characterized by the following figures:

| | |
|---|---|
| specific gravity | 1.22-1.23 |
| specific impact strength | 60 kg.cm.cm² |
| Raschig flowability | 40-60 mm |
| setting rate at 145°C | 1-1.5 min/mm |
| Martens temperature | 120-130°C |

The thermoset produced by the technology described above is used mostly for fabricating shuttles for mechanical weaving looms operating at 240-280 strokes per min. and for automatic looms operating at 230-240 strokes per min. Shuttles made of this material have a service life 3 to 4 times as long as that of wood shuttles.

EXAMPLE 2

Preparation of thermosetting plastics with predominantly shock absorber properties.

The phenolic novolac resin is the same as in Example 1. The mixture is made according to the formulation:

| | |
|---|---|
| polyamide | 6.0 kg |
| phenolic novolac resin | 5.0 kg |
| hexamethylene tetramine | 0.60 kg |
| wood meal | 2.0 kg |
| graphite | 0.55 kg |
| talcum | 0.10 kg |
| oleic acid | 0.12 kg |

The thermoset produced by the technology above described is used mostly for fabricating railway transport details. The preparation technology is the same as described in Example 1. The material obtained is characterized by the following figures:

| | |
|---|---|
| specific gravity | 1.25-1.27 |
| specific impact strength | 80 kg.cm.cm² |
| Raschig flowability | 40-60 mm |
| setting rate at 145°C | 1-1.5 min/mm |
| Martens temperature | 120-130°C |

EXAMPLE 3

Preparation of thermosetting resins with predominantly antifriction properties.

The phenolic novolac resin is the same as in Example 1. The polyamide consists of degraded fishing nets. The mixture is made according to the formulation:

| | |
|---|---|
| polyamide | 7.0 kg |
| phenolic novolac resin | 3.5 kg |
| hexamethylene tetramine | 0.42 kg |
| graphite | 0.35 kg |
| oleic acid | 0.18 kg |

The phenolic resin is mixed thoroughly with the hexamethylene tetramine, graphite and oleic acid to form a homogeneous mass.

Combination of the polyamide with the dry resin is accomplished on a frictionless mill with a mechanical scraper, the polyamide, taken in net form with cell size 8×8–30×30mm and cord diameter of 0.5–1.0 mm.

Combination of the polyamide occurs in the phenolic resin melt, with the temperature of the front roll at 100-100°C and of the rear one, at 20°–30°C. The rear roll is cooled continuously with water to maintain the temperature indicated. Milling is conducted for 3-4 min. to form a homogeneous mass, which is removed from the front roll with the scraper. To obtain the product in granulated form the resulting thermoset sheets are air-cooled and chopped up in a knife-type disintegrator. The finished thermoset has the following physical and mechanical characteristics:

| | |
|---|---|
| specific gravity | 1.2 |
| specific impact strength | 12 kg.cm.cm² |
| Raschig flowability | 80–120 mm |
| setting rate at 140–150°C | 0.6 min/mm |
| Martens temperature | 120–130°C |

The thermoset obtained by the technology described is used predominantly as an antifriction material for friction assemblies and parts.

For example, the service life of the weaving loom bearing bushings made of this material is from 6 to 8 times as long as that of antifriction cast iron bushings.

What we claim is:

1. A thermosetting plastic for loom shuttles and other dynamically heavily loaded shock absorber and antifriction parts, comprising the homogeneous combination product of 35–50 parts by weight of a dry refined phenolic novolac resin having an Ubbelodhe melting point between 105° and 120°C. and a free phenol content not over 4 per cent by weight, 60–70 parts by weight of a polyamide having a bare-celled structure in the form of a net-type fabric, 4.2–6.0 parts by weight of hexamethylene tetramine, 1.2–1.8 parts by weight of a plasticizing agent, 0–20 parts by weight of cellulose, and 2.0–6.5 parts by weight of at least one of the group consisting of graphite, ferric oxide and talcum, and having the following physical and mechanical characteristics:

| | |
|---|---|
| specific gravity | 1.2–1.27 |
| specific impact strength | 10–120 kg.cm/cm² |
| Raschig flowability | 40–120 mm |
| setting rate at 140–150°C. | 0.5–1.5 min/mm |
| Martens temperature | 120–130°C. |

2. A thermosetting plastic according to claim 1 wherein the plasticizing agent is selected from the group consisting of oleic acid and stearic acid.

3. A thermosetting plastic according to claim 1 wherein the cellulose is unspun cotton preliminarily impregnated with a phenolic resole resin.

4. A thermosetting plastic according to claim 1 wherein the cellulose is wood meal.

5. A thermosetting plastic according to claim 1 wherein the polyamide is in the form of used fishnets with a cell size of 8×8 – 120×120 mm and a cord diameter of 0.5–5.0 mm.

6. A thermosetting plastic composition for preparing loom shuttles and other heavily loaded shock absorber parts comprising a dry refined phenolic novolac resin having an Ubbelodhe melting point between 105° and 120°C and a free phenol content not over 4 per cent by weight in an acetone solution with a polyamide in the form of a net-type fabric, hexamethylene tetramine, a plasticizing agent, unspun cotton impregnated with a phenolic resole resin, and at least one of the group consisting of graphite, ferric oxide and talcum, said polyamide and novolac resin being present in the proportion by weight of 60:40–50, said additives in the following weight parts: 0 to 20.0 unspun cotton, 4.8-6.0 hexamethylene tetramine, 1.2 plasticizing agent, 1.0–6.5 graphite, 0 to 1.0 ferric oxide and 0 to 1.0 talcum.

7. A thermosetting plastic according to claim 6 wherein the polyamide is in the form of used fishnets with a cell size of 20×20 – 120×120 mm and a cord diameter of 1.0–5.0 mm.

8. A thermosetting plastic according to claim 6 wherein the cellulose is wood meal.

9. A thermosetting plastic according to claim 6 wherein the plasticizing agent is oleic acid.

10. A thermosetting plastic for antifriction parts, comprising the homogeneous combination products of a dry refined phenolic novolac resin having an Ubbelodhe melting point between 105° and 120°C and a free phenol content not over 4 per cent by weight with a polyamide of bare-celled structure in the form of a net-type fabric to which has been added hexamethylene tetramine, a plasticizing agent, and at least one of the group consisting of graphite, ferric oxide, and talcum, said polyamide and novolac resin being present in the proportion by weight 70:35 and in combination with, 4.2 parts by weight hexamethylene tetramine, 1.8 parts plasticizing agent, and 0 to 3.5 parts graphite, and said plastic having the following physical and mechanical characteristics:

| | |
|---|---|
| Specific gravity | 1.24–1.27 |
| Specific impact strength | 10–12 kg.cm/cm² |
| Raschig flowability | 80–120 mm |
| Setting rate at 140–150°C | 0.5–1.0 min/mm |
| Martens Temperature | 120–130°C |

11. A thermosetting plastic according to claim 10 wherein the polyamide is in the form of degraded fishnets with a cell size of 8×8–30×30 mm and a cord diameter of 0.5–1.0 mm.

12. A thermosetting plastic according to claim 10 wherein the plasticizing agent is selected from the group consisting of oleic acid and stearic acid.

* * * * *